July 17, 1956  R. C. FERGASON  2,754,649
MEANS FOR MOUNTING COTTON PICKING UNIT ON A TRACTOR
Filed June 18, 1953  3 Sheets-Sheet 1

Inventor
Rector C. Fergason
by Kimball A. Wyman
Attorney

July 17, 1956     R. C. FERGASON     2,754,649
MEANS FOR MOUNTING COTTON PICKING UNIT ON A TRACTOR
Filed June 18, 1953     3 Sheets-Sheet 2

Inventor
Rector C. Fergason
By Kimball S. Wyman
Attorney

July 17, 1956  R. C. FERGASON  2,754,649
MEANS FOR MOUNTING COTTON PICKING UNIT ON A TRACTOR
Filed June 18, 1953  3 Sheets-Sheet 3

Inventor
Rector C. Fergason
by Kimball S. Wyman
Attorney

United States Patent Office 2,754,649
Patented July 17, 1956

2,754,649

MEANS FOR MOUNTING COTTON PICKING UNIT ON A TRACTOR

Rector C. Fergason, Gadsden, Ala., assignor to Allis-Chalmers Manufacturing Company, Milwaukee, Wis.

Application June 18, 1953, Serial No. 362,503

13 Claims. (Cl. 56—11)

This invention relates generally to crop harvesting and more particularly to the provision of harvesting apparatus which can be readily detachably combined with a conventional farm tractor for efficient operation.

Prior to applicant's invention, numerous attempts have been made to detachably mount cotton picking apparatus on a conventional farm tractor without effecting changes in the construction and/or location of component tractor parts and involving, for instance, the spacing and size of the rear traction wheels, the dirigible front wheel mounting and arrangement, the operator's station, the power lift mechanism, and the usual controls. Further, these attempts have also been especially concerned with the provision of apparatus which can be readily attached and removed by only one person. However, these prior attempts, even though limited to the attachment of a one-row picking mechanism, have not proved particularly successful in eliminating either the aforementioned changes or the need for additional help in effecting such changes.

Changes in the construction and location of component tractor parts usually increase both the weight and initial cost and in addition necessitates the expenditure of considerable time, effort and skill. A high initial cost presents a serious obstacle to the mechanized picking of cotton grown on small acreages as these growers cannot readily afford a large capital investment for specialized apparatus. In fact, the initial cost of the previously available one-row mountable picking mechanisms, as distinguished from stripping mechanisms, has been sufficiently high to prevent their being seriously competitive with either the self-propelled machines now in general use or with hand labor.

Further, the small acreage cotton grower can seldom afford either the loss of crop or quality which frequently results if picking must await the arrival of a mechanized jobber or of the help necessary for hand picking. As as practical matter the general labor situation is presently such that it is not entirely satisfactory to grow cotton on the basis that help will be available for hand picking as required. This problem is particularly acute in growing many varieties of high yield cotton, as distinguished from the storm proof varieties grown in certain areas in the southwest, since the bolls of the former become ripe over a considerable period of time whereas those of the latter become ripe substantially at one time. Consequently, the high yield varieties generally require two or more pickings in order to obtain a good yield of high quality cotton.

Still further, the ease with which the picking mechanism may be attached to a tractor or removed therefrom, is also of special importance to the small acreage grower. As previously indicated, the tractor mounting the picking mechanism must be available for the performance of other farm operations. Moreover ready availability should be attainable through the efforts of only one person as it may even be difficult for the small acreage cotton grower to get timely help for attaching and removing the picking mechanism as desired.

Also, the mounting of an efficient cotton picker unit at the rear of a tractor in a heretofore proposed manner by pivotally attaching a pair of laterally spaced lift arms to the top side of the picker unit substantially at its center of gravity in the fore and aft direction poses a serious problem of maneuverability particularly in traversing across fields containing one or more ditches, furrows or similar depressions, hereinafter called furrows. In crossing a furrow and regardless of its purpose the rear end of the picker unit frequently more firmly engages the ground at the rearward side of the furrow prior to the rear tractor wheels reaching the bottom thereof. As a result, much of the weight of the picker unit which is normally supported by the tractor is transferred to the ground thus materially reducing traction at a time when the utmost in tractive effort is required. Consequently, the tractor may readily stall in crossing a narrow furrow. In operation, a power take-off shaft on the tractor is usually connected with the picker unit through telescoped shaft sections having their remote ends universally coupled with the power take-off shaft and with the power receiving shaft of the picker unit, respectively. Consequently, the extent to which these telescoped shaft sections can be moved vertically relative to the horizontal without subjecting their universal joints to destructive vibration or to damage due to cramping or contact with adjacent tractor or picker parts is rather limited. Moreover, raising a picker unit beyond the limit for damage-free operation of such universal joints may occur for a number of reasons including an attempt to avoid the possibility of stalling through contact of the picker unit with the ground in crossing a furrow as previously mentioned. In fact, the need for raising the unit in the foregoing example, usually arises in the nature of an emergency and is therefore effected hurriedly with but little, if any, attention being given to the extent to which the unit is raised. As a result, the universal joints either become damaged sufficiently to require immediate replacement or their operative life is materially shortened. In addition, the picker units which have been attached to the rear of a tractor as hereinbefore mentioned are of a design such that the center of gravity is generally aligned both laterally and in the fore and aft direction with the plant receiving tunnel or passage extending through the unit in a fore and aft direction. Consequently, in order to avoid interference with the plants entering the tunnel it has been necessary to utilize either a pair of low stabilizing links positioned to extend forward from laterally opposite front side portions of the unit or a single link extending forward from one of said side portions. Obviously, the use of two links is objectionable since it materially increases cost and renders adjustment of the position of the unit more difficult, whereas the use of a single link compressively supporting only one side of the unit subjects the lift arms to considerable torsional strain particularly when the forward end of the unit which is remote from the link meets with an obseruction. Actually, the strain on the lift arms may be sufficient to necessitate the provision of bracing elements or special arms which in turn further increases the initial cost.

Therefore, with the foregoing in mind, it will be appreciated that applicant's invention is especially concerned with and has as an object the provision of a picker unit mounting designed and constructed for ready attachment to the rear of a conventional farm tractor without the necessity of effecting changes in the construction or location of standard items such as the lift arms and rock shaft, the mountings for and size of the hydraulic rams, the rear axle structure, the spacing and size of the rear traction wheels, the dirigible front wheel support, the operator's station, and the usual controls.

Further, it is an object of the present invention to combine a conventional farm tractor and harvesting apparatus to provide a safe efficient mobile harvester embodying novel features of construction, mounting, and coaction designed to minimize the undesirable stressing of attaching parts and to improve maneuverability and the ease with which the harvesting apparatus may be attached to the tractor or removed therefrom.

A further object of this invention is the provision of a mobile harvester comprising a conventional farm tractor having a cotton picker unit adjustably mounted at the rear thereof in a novel manner enabling the tractor to readily travel across furrows and the like.

Still another object of the present invention is to provide a conventional farm tractor with a rear attached picker unit having parts combined in a novel manner for effective coactive protection of the mechanism for transmitting power from the tractor to the picker unit.

An additional object of this invention involves attaching a cotton picker unit to the rear of a conventional farm tractor in a novel manner designed to provide a unique construction and coaction of parts effectively utilizing apparatus furnished as standard tractor equipment such as the lift arms and rock shaft, the hydraulic system, the ram mountings and the rams.

Accordingly, the present invention may be considered as comprising the various features of construction, combination and/or subcombination as is hereinafter more fully set forth in the detailed description and appended claims; reference also being had to the accompanying drawings wherein:

Figure 2:
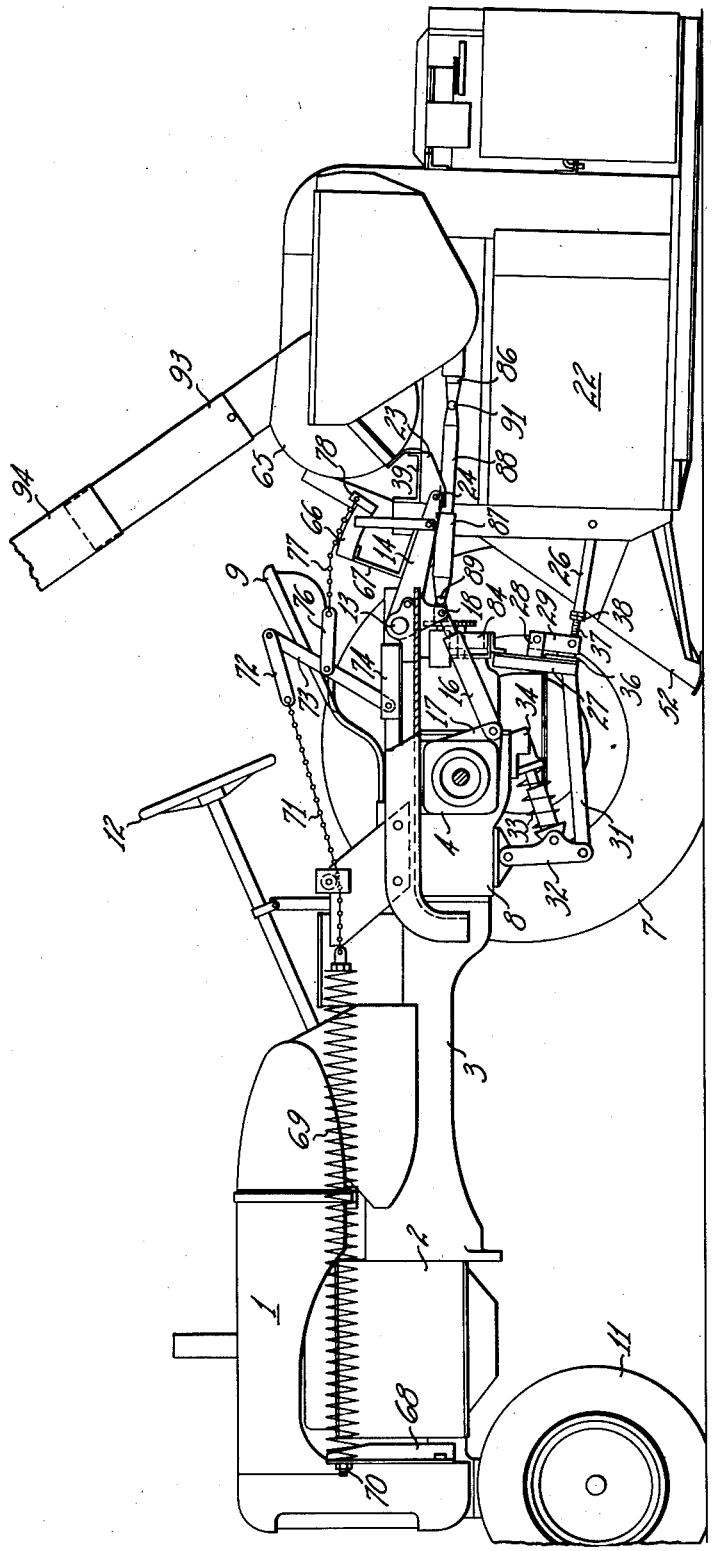
Fig. 2 is a side elevation of the combination shown in Fig. 1 with the nearside rear wheel removed in the interest of clarity.
Figure 3:
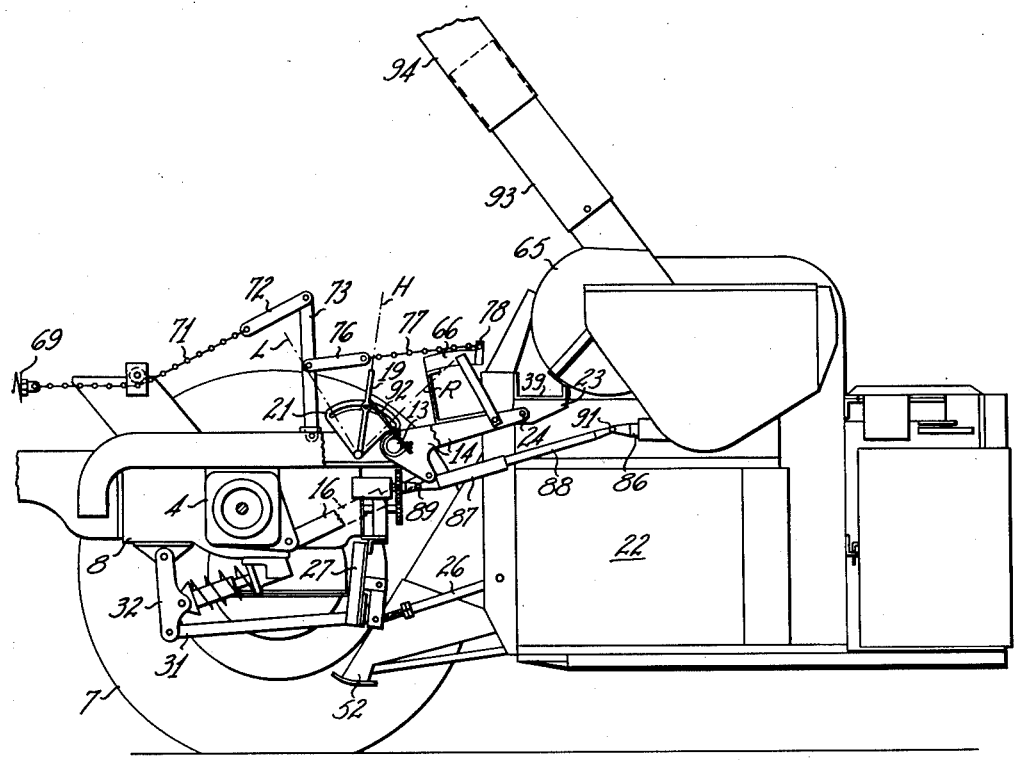
Figure 4:
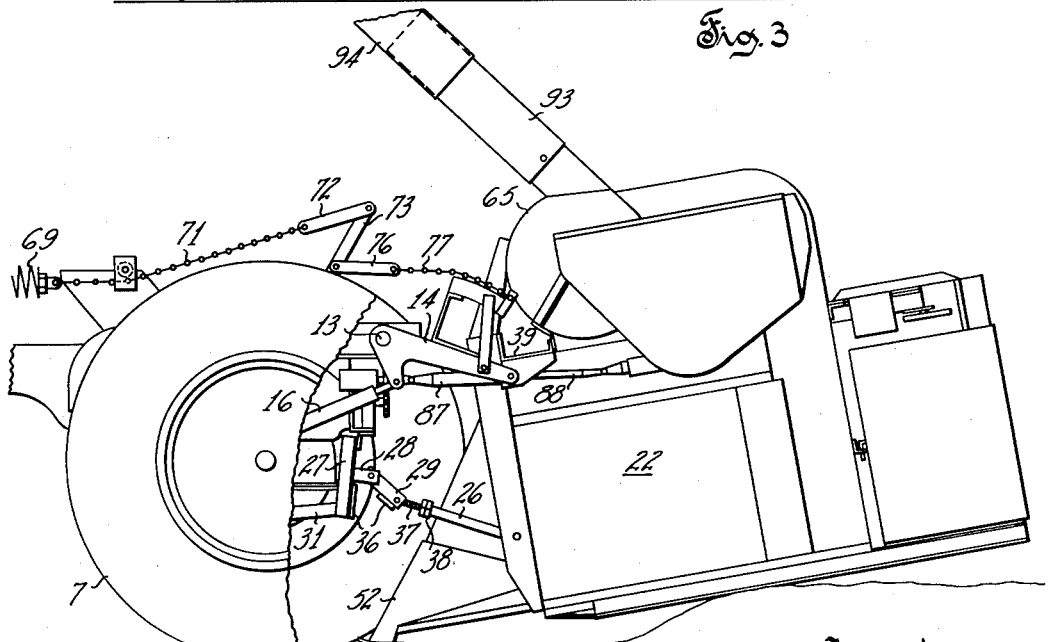

Fig. 3 is a view of the rear portion of combination shown in Fig. 2, this view illustrating the coaction of parts in limiting the height to which the unit harvester structure may be automatically raised relative to the power take-off shaft; and Fig. 4 is a view similar to Fig. 3 illustrating what takes place when the rear end of the unit harvester structure engages the ground in a manner causing its rear end to move upward relative to the lift arms.

Figure 1:
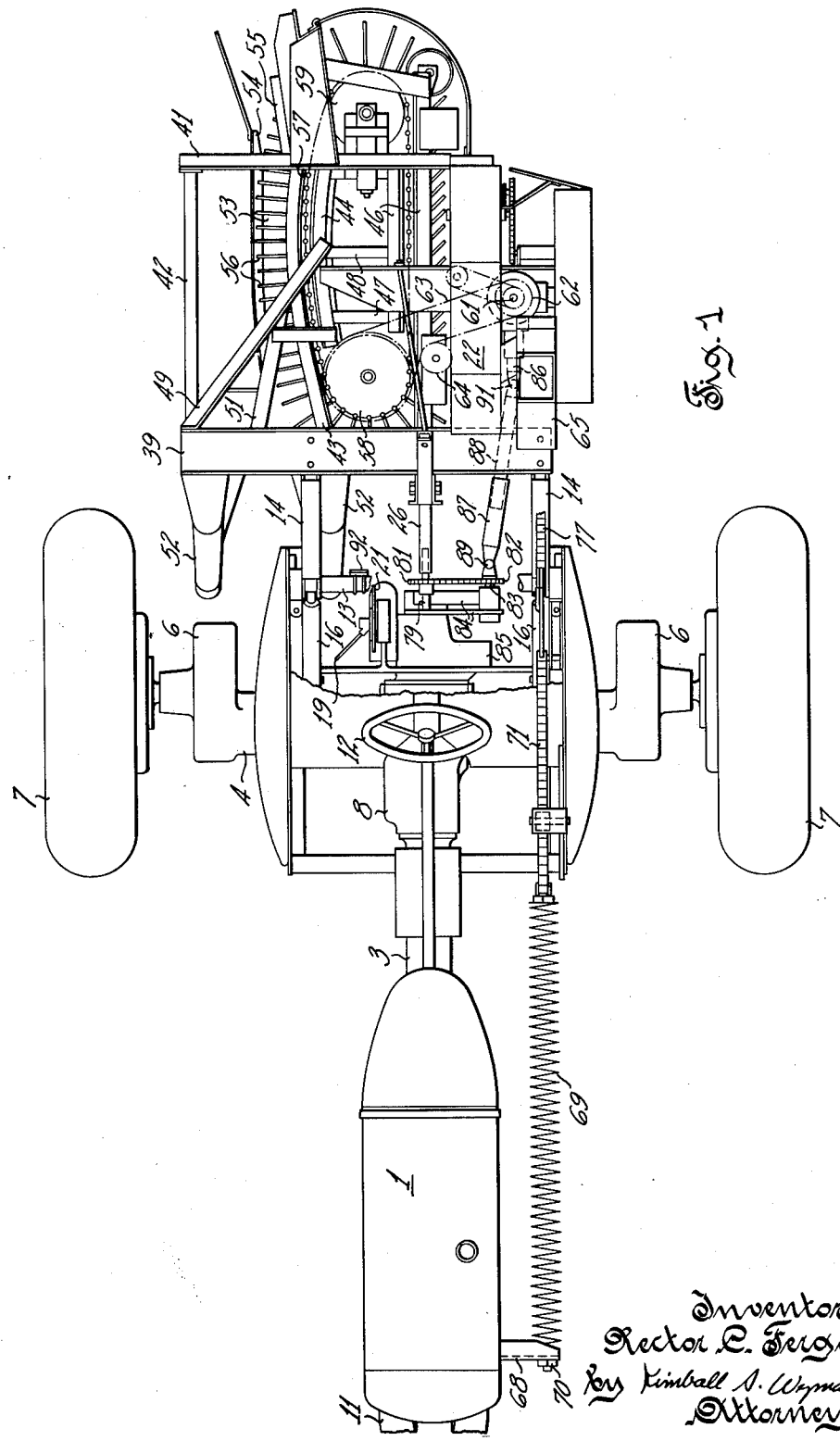
Fig. 1 is a plan view of a tractor mounted cotton picker embodying the invention with portions broken away to better show the coaction of certain of the parts.

Referring particularly to Figs. 1 and 2 of the drawings, it will be noted that the invention is shown as applied to a conventional tricycle type tractor 1 including a power unit or engine 2, a torque tube 3, and a transversely disposed rear axle structure 4 terminating at opposite ends in depending drop axle structures 6 including gearing (not shown) connected in power transmitting relation to the traction wheels 7 in a known manner. Power from the engine 2 is controllably transmitted through the torque tube to suitable transmission gearing enclosed in a housing 8 projecting forward from the transverse axle structure 4, it being understood that the tractor is provided with the usual engine and transmission controls (not shown). The tractor is also provided with an operator's station or seat 9 disposed somewhat to the rear of the transverse axle structure 4 and with a suitable steering mechanism operatively coupled with the dirigible front wheels 11 in a conventional manner (not shown) and including a wheel 12 disposed within easy reach of the operator's station.

In addition, the tractor is provided with a rigid transverse rock shaft 13 disposed to the rear of and generally parallel to axle structure 4, this rock shaft being provided with a pair of laterally spaced rearwardly extending generally parallel lift arms 14 fixed on the shaft for movement therewith. Rocking movement of the shaft is selectively controlled by means of a suitable hydraulic system including a pair of rams 16 (only one of which is clearly shown in the interest of clarity) having their cylinder portions swingably fixed to similar brackets 17 attached to the rear axle structure. The piston rod portion of each ram is pivotally attached to a depending arm 18 rigid with the associated lift arm 14. Operation of the hydraulic system is controlled by means of a hand lever 19 and quadrant 21 (note also Fig. 3) disposed in convenient accessible relation to an operator sitting on the tractor seat 9. This hand lever has three main positions, namely; raise, lower and hold, respectively, designated R, L, and H on Fig. 3, it being understood that when the hand lever is moved to its position R the rams expand and rock shaft is turned counter-clockwise until the rams are fully expanded; that when the lever is in its position L the rams contract and the rock shaft turns clockwise until the rams are fully contracted; and that when the lever is in its position H the rock shaft is retained in whatever position it was at the time the lever was moved to its hold position. The delivery of hydraulic fluid under pressure to the rams is thus manually controlled and if further information is desired concerning the details of construction and operation of such a system, reference may be had to the U. S. Patents to W. F. Strehlow et al., 2,611,306 and 2,611,307. However, for purposes of the present invention it should suffice to understand that the operation of the rock shaft is effected through a manually controlled power transmitting means selectively operable to raise or lower the lift arms 14 as desired within the range of movement afforded by the expansion and contraction of the rams and that said arms may be held in any selected position within said range.

A rotary spindle type cotton picking unit 22 is provided with a pair of similar laterally aligned top side portions in the form of detachable brackets 23 which are swingably connected to the rear ends of the lift arms 14 by means of removable pivot pins 24. A forward lower portion of the unit 22, intermediate the brackets 23, is swingably attached to a compression load transmitting means in the form of a telescoping stabilizing link 26. The forward end of link 26 has a lost motion connection with a lower portion of the tractor through lost motion connecting means comprising a hinge structure including a fixed bracket or first element 27 provided with a rearwardly extending projection or support 28 pivotally mounting a depending lever or second element 29, the latter being pivotally connected to the foremost one of the separable sections of the telescoping stabilizing link elements 26. Bracket 27 is braced against longitudinal movement by means of a longitudinally extending brace 31 having its forward end secured to a depending draft lever 32 which is a standard part of the conventional tractor. This connection between draft lever 32 and bracket 27 renders the biasing spring 33 interposed between this lever and a part 34 fixed on the underside of the tractor inoperative. Consequently a further reference to this construction is considered unnecessary, it being understood that for all practical purposes the bracket 27 is fixed in depending relation to a rear portion of the tractor. However, it should be noted that the rear side of bracket 27 and the opposed side of lever 29 are provided with resilient bumper elements or pads 36 which are engaged when the parts are positioned as shown in Figs. 1, 2 and 3. Also, it should be noted that the telescoping links connecting the lower portion of lever 29 with a lower forward portion of the picker unit 22 includes a threaded section 37 on which are disposed a pair of nuts 38 which together with the forward end face of the tubular section of the link 26 form stop parts adjustably coacting to selectively vary the combined minimum length of the stabilizing link.

The picker unit 22 comprises a generally rigid frame structure including a front cross member 39 and a rear cross member 41 fixedly united by a plurality of longitudinally extending frame elements 42, 43, 44 and 46. In addition, the frame may include transverse elements 47, 48 and the diagonal braces 49, 51. The right side of the picking unit, as seen when looking forward toward the front of the tractor, is provided with a pair of laterally spaced divider or gathering points 52 designed to direct the plants into a suitable picking tunnel 53 formed by laterally opposed parts 54 and 55 carried by the frame structure, the tunnel being traversed by the rotating spindle structures 56 which may be generally of the type disclosed in Rust et al. patent, U. S. 2,058,513. The spindle structures are mounted on endless carriers such as chains 57 operatively trained around a pair of vertically spaced front drive sprockets 58 and around a pair of vertically spaced rear idler sprockets 59, of which only the uppermost sprockets are shown in the interest of clarity. The front drive sprockets are driven from a vertically disposed shaft 61 having a sprocket 62 thereon which is connected by a chain 63 to the upper one of the front drive sprockets, an idler sprocket 64 being preferably employed to attain proper chain tension. Other moving parts of the picking mechanism such as the doffing and cotton conveying mechanism, including the blower 65, are also driven from the vertically disposed shaft 61 through any suitable means (not shown) but a further description of these features of the picking mechanism is believed unnecessary for a complete understanding of the present invention.

In addition to the picking unit supports comprising the lift arms 14 and the stabilizing link 26, a counterbalancing mechanism is provided comprising a cam sector 66 carried by a bracket structure 67 detachably fixed on the nearside lift arm 14 (as viewed in Fig. 2) in vertically overlying relation thereto. The forward end of the tractor is provided with a nearside bracket projection 68 having a mounting 70 adjustably supporting the forward end of a balance spring 69 having its rear end connected by a chain or cable 71 with a link 72 pivotally secured to the upper end of a lever 73 having its lower end fulcrumed on a bracket 74 detachably fixed to a top side portion of the rear axle structure 4. An intermediate portion of lever 73 is provided with a rearwardly extending link 76 having its rear end connected by a chain or cable 77 with an upstanding tab or projection 78 at the rear end of the cam sector 66, the chain passing over the top cam surface presented by the sector. The desired counterbalancing effect of the spring is attained by appropriately manipulating the adjustable mounting 70 for the front end thereof, it being generally preferable that the spring exert a lifting force which is sufficient, when the picker is in its operative position (shown in Fig. 2), to carry most of the picker weight on the tractor and yet have the rear end of the picker engaging the ground with sufficient force to prevent bouncing thereof as the tractor travels over uneven ground. Further, the design of cam sector and its mounting on the near lift arm is such that the balance spring exerts a substantially uniform lift force throughout the range of vertical movement of the picking unit effected by complete expansion of the rock shaft actuating rams 16.

Power for operating the picking mechanism is derived from the tractor through a suitable power take-off mechanism comprising a central longitudinal shaft 79 mounting a sprocket 81 thereon which is in driving alignment with a vertically and laterally offset sprocket 82 fixed on a stub shaft 83 rotatably mounted on a rigid bracket structure 84 fixed to a rearwardly projecting housing portion 85 of the axle structure 4. The axis of rotation of sprocket 82 is somewhat offset from the axis of rotation of a forwardly extending power input shaft 86 rotatably mounted on the near top side portion of the picker unit, shaft 86 having its rearmost end operatively connected with vertical shaft 61 through a suitable gearing (not shown). The forward end of power input shaft 86 and the rear end of power take-off stub shaft 83 are united by universal couplings or joints 89 and 91 with the opposite or remote ends of a power transmitting shaft comprising the separable telescoping sections 87 and 88, it being understood that when the power transmitting mechanism is operated through the usual tractor controls (not shown) that power is transmitted to vertical shaft 61 for operating the various power driven elements of the picking unit 21.

Having in mind the previously described mounting structure for the picking unit, it will be apparent that actuation of the rock shaft 13 (controlled by manual lever 19) is effective to raise, lower or hold the picking unit in any position throughout its range of vertical movement. Preferably, the length of the adjustable telescoping stabilizing link structure is made such that the rear end of the picking unit engages the ground as indicated in Fig. 2 while its forward end is spaced somewhat above the ground so as to prevent the latter end from digging into the ground in the event the tractor wheels are in a depression. As is the usual practice, the gathering and divider points 52 are hingedly connected to the forward end of the unit through a conventional means (not shown) so as to floatingly engage the ground as indicated in Fig. 2. When the picker is thus positioned relative to the tractor, it will be appreciated that most of the weight of the picker is carried by the tractor and more particularly, by the rear traction wheels 7 thus affording maximum tractive effort for propelling the unit.

As previously indicated, the power means including the rams 16, and the control means including the hand lever 19, are standard equipment and the range of vertical movement afforded by complete expansion of the rams 16 is such that when the picking unit is thus fully raised the universal couplings uniting the opposite ends of the telescoped power transmitting shaft sections 87 and 88 with the power take-off stub shaft 83 and the power input shaft 86, respectively, exceed the permissible angle for trouble free operation of the universal couplings 89 and 91. In other words, if the picking unit were to be raised to such a height, the universal couplings would be cramped or angled to an extent which creates excessive vibration, undue wear and possible breakage. Further, while it is possible to control the exact height to which the unit is thus raised by actuation of the control lever 19, the need for raising the unit sometimes occurs in the nature of an emergency and as a result, the control lever is suddenly moved to its full lift position. In any event, if the tractor operator is fully occupied with maneuvering the tractor, the unit is likely to be raised to its upper extreme thus damaging the universal couplings. In accordance with one phase of the present invention, such damage is avoided by providing the rock shaft 13, which extends closely adjacent the manual control lever 19, with an arm 92 adjustably fixed thereon in a position to engage the control lever and automatically move it to its hold position H whenever the unit is raised to the permissible height. This feature and the necessary coaction of parts is clearly shown in Fig. 3 from which it will be noted that control means, including lever 19, are operatively associated with power means, including rams 16, and that such control means are manually operable to selectively effect up and down adjustment of the harvester unit 22. The arm 92 represents motion transmitting means operatively connected with the rock shaft 13, and such motion transmitting means are cooperable with the control means for the rams 16 so as to automatically prevent raising movement of the harvester unit to a height exceeding the permissible angling of the universal joints 89 and 91.

Another feature of the invention of considerable importance concerns the provision of a lost motion stabilizing link construction which upon the traction wheels 7 entering a furrow in traveling thereacross enables the lower portion of picker unit 22 to move rearward relative to the tractor upon engagement with the ground at the edge of the furrow. This permits the rear end of the unit to move upward about its point of pivotal connection with the rear ends of the lift arm 14 and assume a position such as that shown in Fig. 4, all to the end of minimizing transfer of picker weight from the lift arms and thereby from the rear traction wheels to the ground. Consequently, under these conditions the tractive effort of the tractor remains at or near the maximum present when the picker is in its normal operating position and therefore there is but little likelihood of the tractor becoming stalled in crossing a furrow. Also it is to be noted that while the lost motion connecting means is shown as comprising the bracket structure 27 and 28, the lever 29, and the resilient pad disposed therebetween to absorb impact shock resulting from a sudden reengagement of these parts as the tractor wheels move out of the furrow, the telescoped stabilizing link structure 26 will also afford this result or permit a further rearward movement of the unit relative to the tractor in the event the furrow is sufficiently deep. In addition, it should be apparent that the lost motion means comprising the bracket 27, 28 and lever 29 could be dispensed with by relying on the telescoping action of the stabilizing link 26. However this is generally undesirable in that an impact reengagement of the telescoped sections would necessarily be absorbed through the adjusting nuts 38 which would soon damage the threads and render adjustment of the length of the link difficult, if not impossible.

Referring again to Fig. 1, a feature of further importance resides in the fact that the center of gravity of the picking unit is disposed laterally between and rearward of its points of connection with the rear ends of the lift arms 14. In fact, the center of gravity of the unit lies in proximity to a vertical longitudinal plane generally coincident with the stabilizing link 26 thus minimizing torsional strain on the lift arms and the associated parts of the picker unit frame structure. In addition, the feature of having the center of gravity of the unit to the rear of its points of connection with the lift arms 14 is also of importance in affording rearward movement of the bottom portion of the unit relative to the tractor with a consequent transfer of a minimum amount of picker weight from the tractor to the ground, as previously mentioned.

The picker mounting, as previously described, affords a relatively simple mode of attachment and detachment, which can be readily effected by only one person, since all that is necessary in order to detach the picker unit from the tractor is to either remove the attaching brackets 23 detachably secured to the underside of front cross member 39 or to remove the pins 24 connecting the rear ends of the lift arms 14 with such brackets, preferably after the spring 69 has been relaxed, the tractor may be driven away from the picking unit since the fan spout 93 has a readily separable telescoping connection with an upper spout section 94 carried by a basket structure or picked cotton receptacle (not shown). Of course if the tractor is to be used for other purposes, it may be preferable to disconnect the forward end of the stabilizing link 26 from the lower end of the lever 29 or the upper end of lever 29 from the bracket projection 28 by removing the pins uniting such parts, respectively. In order to relieve the rock shaft 13 from the bias of the counter balancing spring 69, the cable 77 may be disconnected from the projection 78 on the cam sector 66, or the entire bracket structure 67 may be removed from the near lift arm 14.

In reattaching the picking unit to the tractor, all that has to be done is to back the tractor toward the picker and into a position such that the telescoped power transmitting shafts 87, 88 are in approximate longitudinal alignment whereupon the shaft sections can be held in alignment while the tractor is moved toward the picker until the telescoping of these shaft sections is effected. When this has been done, a further rearward movement will bring the ends of the lift arms 14 into alignment with the pin receiving holes in the brackets 23 or the latter into alignment with the bolt receiving holes in the front cross member 39. Completion of the attaching operation is then effected in an obvious manner by re- connecting the balance spring mechanism, the stabilizing link and the fan spout structure.

It should now be apparent that apparatus constructed in accordance with the present invention readily affords all of the advantages of operation and attachment hereinbefore pointed out. Moreover, while the disclosed apparatus constitutes a preferred embodiment of the invention, it is to be understood that the protection to be secured is not intended to be limited to the exact details of construction and combination herein disclosed for purposes of illustration as various modifications within the scope of the appended claims may occur to persons skilled in the art.

It is claimed and desired to secure by Letters Patent:

1. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned top side portions pivotally attached to rear end portions of said arms for vertical swinging movement relative thereto, said unit structure having its center of gravity disposed to the rear of its points of attachment to said lift arms; and a compression load transmitting link means having its opposite ends swingably connected to longitudinally spaced lower portions of said unit structure and of said tractor, respectively, said lower portions being disposed in proximity to a vertical longitudinal plane passing approximately through the center of gravity of said unit structure.

2. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto, said unit structure having its center of gravity disposed to the rear of and approximately laterally midway between said lift arms; and a compression load transmitting link means having its opposite ends swingably connected to lower longitudinally spaced portions of said unit structure and of said tractor, respectively, said lower portions being disposed in proximity to a vertical longitudinal plane passing approximately through the center of gravity of said unit structure.

3. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto, said unit structure having its center of gravity disposed to the rear of and laterally between said lift arms; and a compression load transmitting link means having its opposite ends pivotally connected to lower portions of said unit structure and of said tractor, respectively, said lower portions being disposed in proximity to a vertical longitudinal plane passing approximately through the center of gravity of said unit structure, said means including normally engaged, relatively movable elements rendering said means extensible rearward in response to said unit structure engaging the ground in a manner tending to raise the rear end of said unit structure relative to said lift arms; and a resilient bumper means operatively associated with said elements to absorb the impact force produced by a sudden reengagement of said elements.

4. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; and a compression load transmitting means having its opposite ends swingably attached to longitudinally spaced lower portions of said unit structure and tractor, said means including relatively movable elements rendering said means extensible rearward in response to said unit structure engaging the ground in a manner tending to raise the rear end of said unit structure relative to said lift arms.

5. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; a compression load transmitting means having its opposite ends swingably attached to longitudinally opposed lower portions of said unit structure and tractor, said means including normally engaged, relatively movable elements rendering said means extensible rearward in response to said unit structure engaging the ground in a manner tending to raise the rear end of said unit structure relative to said lift arms; and a resilient bumper means operatively coacting with said elements to absorb the impact force produced by a sudden reengagement of said elements.

6. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having lateraly aligned forward top side portions pivotally attached to rear end portions of said arms for vertical swinging movement relative thereto; an elongated, longitudinally adjustable compresion load transmitting means having its opposite ends swingably attached to longitudinally spaced lower portions of said unit structure and of said tractor, respectively, said means including normally engaged, relatively movable elements rendering said means extensible rearward in response to said unit structure engaging the ground in a manner tending to raise the rear end of said unit structure relative to said lift arms.

7. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; and a compression load transmitting means having its opposite ends swingably attached to longitudinally spaced lower portions of said unit structure and of said tractor, respectively, said means including longitudinally telescoped link elements rendering said means extensible rearward in response to said unit structure engaging the ground in a manner tending to raise the rear end of said unit structure relative to said lift arms, and including stop parts adjustably coacting to selectively vary the combined minimum length of said telescoped elements.

8. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; and a compression load transmitting means having its opposite ends swingably attached to longitudinally spaced lower portions of said unit structure and of said tractor, respectively, said means including a hinge structure comprising a first element fixedly secured to said tractor and a second element pivotally suspended on a support therefor and disposed in abutting relation to a rear side portion of said first element, and including a pivot connection between said unit structure and a lower portion of said second element, said second element rendering said means extensible rearward in response to said unit structure engaging the ground in a manner tending to raise the rear end of said unit structure relative to said lift arms.

9. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; a compression load transmitting means having its opposite ends swingably attached to longitudinally spaced lower portions of said unit structure and of said tractor, respectively, said means including a hinge structure comprising a first element fixedly secured to said tractor and a second element pivotally suspended on said first element in abutting relation to a rear side portion of the later, and including a pivot connection between said unit structure and a lower rear portion of said second element, said second element rendering said means extensible rearward in response to said unit structure engaging the ground in the manner tending to raise the rear end of said unit structure relative to said lift arms; and a resilient bumper means operatively interposed between said first and second elements.

10. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; and a compression load transmitting means having its opposite ends swingably connected to longitudinally spaced lower portions of said unit structure and of said tractor, respectively, said means including a hinge structure comprising a first element fixedly secured to said tractor and a second element pivotally suspended on said first element in abutting relation to a rear side portion of the latter, and including a pair of telescoped link elements having their remote ends pivotally connected to said unit structure and to a lower portion of said second element, respectively, said link elements and said second element rendering said means extensible rearward in response to said unit structure engaging the ground in a manner tending to raise the rear end of said unit structure relative to said lift arms.

11. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; and a compression load transmitting means having its opposite ends swingably connected to longitudinally spaced lower portions of said unit structure and of said tractor, respectively, said means including a hinge structure comprising a first element fixedly secured to said tractor and a second element pivotally suspended on said first element in abutting relation to a rear side portion of the latter, including a pair of telescoped link elements having their remote ends pivotally connected to said unit structure and to a lower portion of said second element, and including stop parts adjustably coacting to selectively vary the combined minimum length of said telescope link elements, said link elements and said second element rendering said means extensible rearward in response to said unit structure engaging the ground in a manner tending to raise the rear end of said unit structure relative to said lift arms.

12. In a tractor having a wide rear axle structure, a rock shaft operatively mounted on said tractor to extend transversely thereof adjacent said axle structure, and a pair of lift arms fixed on said shaft in laterally spaced rearwardly extending parallel relation for movement therewith, the combination comprising: a unit harvester structure having laterally aligned forward top side portions pivotally attached to rear end portions of said arms for vertical swinging movement relative thereto; and a compression load transmitting means having its opposite ends swingably connected to longitudinally spaced lower portions of said unit structure and of said tractor, respectively, said means including a hinge structure comprising a first element fixedly secured to said tractor and a second element pivotally suspended on said first element in abutting relation to a rear side portion of the latter, including a pair of telescoped link elements having their remote ends pivotally connected to said unit structure and to a lower portion of said second element, respectively, and including parts adjustably coacting to selectively vary the combined minimum length of the said telescoped link elements, said link elements and said second element rendering said means extensible rearward in response to said unit structure engaging the ground in a manner tending to raise the rear end of said unit structure relative to said lift arms; and a resilient bumper means operatively associated with a coacting pair of said elements to absorb the impact force produced by a sudden return of said elements to their normal positions.

13. In a tractor including a wide rear axle structure, a power take-off shaft operatively mounted on said tractor in a fixed position extending longitudinally of the tractor at the rear thereof, a rock shaft operatively mounted on said tractor to extend transversely thereof, and including a pair of lift arms fixed on said shaft in laterally spaced parallel relation for movement therewith, the combination comprising: a unit harvester structure having laterally aligned forward top side portions swingably attached to end portions of said lift arms, said unit structure having a power input shaft disposed adjacent the top side thereof in longitudinally parallel relation to said power take-off shaft; a pair of telescoped shaft sections; a pair of universal joints operatively coupling the remote ends of said telescoped shaft sections with said power take-off shaft and with said input shaft, respectively; a compression load transmitting means operatively uniting a lower portion of said unit with a longitudinally spaced portion of said tractor; power means for rotating said rock shaft and operable to raise said unit structure to a height exceeding the permissible angling of said universal joints; control means operatively associated with said power means and manually operable to selectively effect up and down adjustment of said unit structure; and motion transmitting means operatively connected with said rock shaft and cooperable with said control means so as to automatically prevent raising movement of said unit by said power means to a height exceeding the permissible angling of said universal joints.

References Cited in the file of this patent

UNITED STATES PATENTS

| | | |
|---|---|---|
| 1,802,022 | Johnston et al. | Apr. 21, 1931 |
| 2,346,757 | Horner | Apr. 18, 1944 |
| 2,352,291 | Scarratt et al. | June 27, 1944 |
| 2,611,307 | Strehlow et al. | Sept. 23, 1952 |
| 2,645,890 | Spedding | July 21, 1953 |
| 2,649,677 | Paradise | Aug. 25, 1953 |